Figure 1:
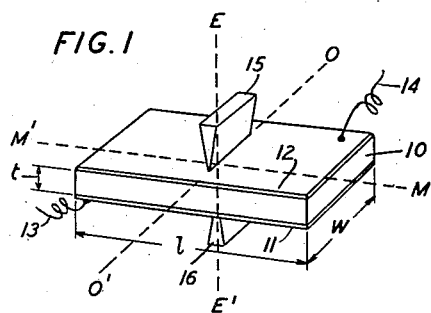

June 30, 1936.   W. P. MASON   2,045,991
WAVE FILTER
Filed Jan. 26, 1933    4 Sheets-Sheet 1

INVENTOR
W. P. MASON
BY G. H. Stevenson
ATTORNEY

June 30, 1936.    W. P. MASON    2,045,991
WAVE FILTER
Filed Jan. 26, 1933    4 Sheets-Sheet 2

INVENTOR
W. P. MASON
BY G. H. Stevenson
ATTORNEY

June 30, 1936.   W. P. MASON   2,045,991
WAVE FILTER
Filed Jan. 26, 1933   4 Sheets-Sheet 3

INVENTOR
W. P. MASON
BY *G. H. Stevenson*
ATTORNEY

June 30, 1936.   W. P. MASON   2,045,991
WAVE FILTER
Filed Jan. 26, 1933   4 Sheets-Sheet 4

INVENTOR
W. P. MASON
BY
G. H. Stevenson
ATTORNEY

Patented June 30, 1936

2,045,991

UNITED STATES PATENT OFFICE 2,045,991

WAVE FILTER

Warren P. Mason, West Orange, N. J., assignor to Bell Telephone Laboratories, Incorporated, New York, N. Y., a corporation of New York Application January 26, 1933, Serial No. 653,622
In Canada September 19, 1931

16 Claims. (Cl. 178—44)

This invention relates to wave transmission networks and more particularly to frequency selective network employing piezo-electric crystals as impedance elements.

An object of the invention is to improve the transmission characteristics of broad-band wave filters for use at high frequencies. Another object is to improve the characteristics of wave filters employing piezo-electric impedance elements. A further object is to provide for the combination of piezo-electric crystals with other impedance elements in wave filter structures without introducing serious energy dissipation effects.

The present specification includes subject matter relating to lattice type wave filters disclosed in my earlier copending application Serial No. 489,268, filed October 17, 1930.

The well known property of low energy dissipation in piezo-electric crystals such as quartz crystals makes these devices highly suitable for frequency selective purposes in electrical circuits. Their application to broad-band wave filters, however, has heretofore been limited because of the extreme sharpness of the crystal resonance characteristic the effect of which is to restrict the transmission to bands of very small width.

In accordance with this invention, filters with wide transmission bands are made possible, while at the same time the advantages arising from the low energy dissipation in the crystal are maintained, by the use of combinations of piezo-electric crystals with simple inductance and capacity elements as the branches of a lattice type network. Furthermore, by suitably proportioning the electrical elements with respect to the crystals, advantageous attenuation characteristics are obtained and the frequency discriminating properties of the filters are greatly improved.

A feature of the invention lies in the proportioning of the inductance elements associated with the crystals so that the electrode capacities of the crystals are substantially neutralized at the frequencies of the transmission band. By virtue of this the maintenance of high attenuation at frequencies remote from the band becomes possible. Other features relate to special circuits in which the associated electrical elements are connected in branches external to the lattice and to circuit arrangements for connecting a plurality of lattice filters in tandem.

Figure 5:
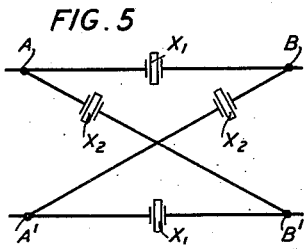
Figure 6:
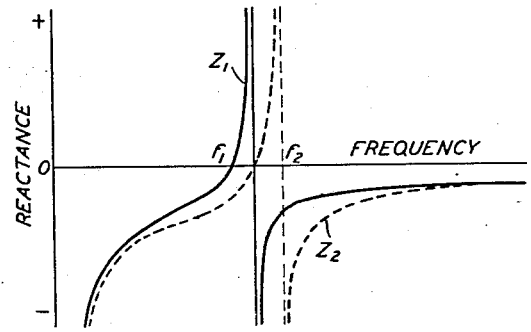
Figure 8:
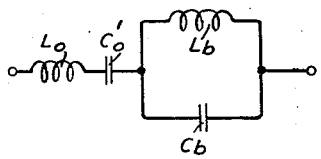
Figure 9:
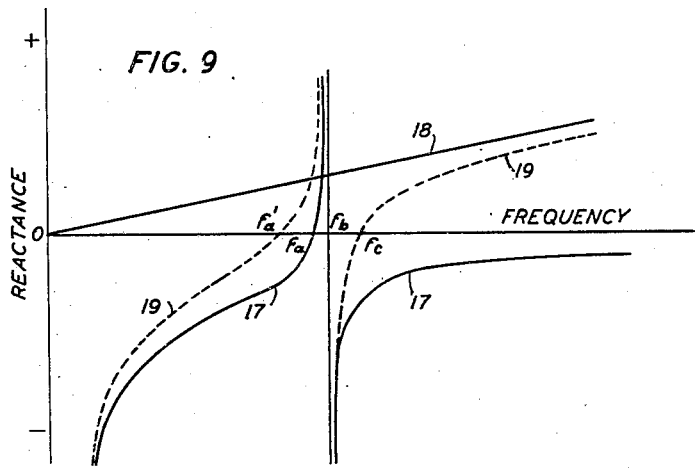
Figure 10:
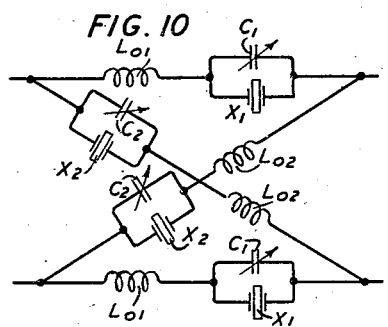
Figure 11:
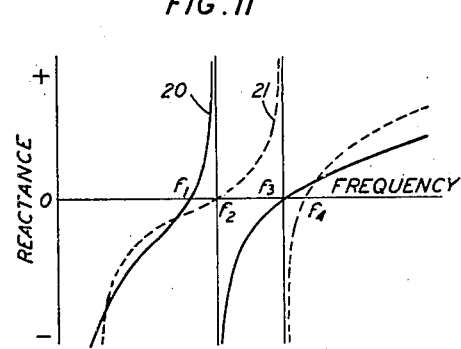
Figure 12:
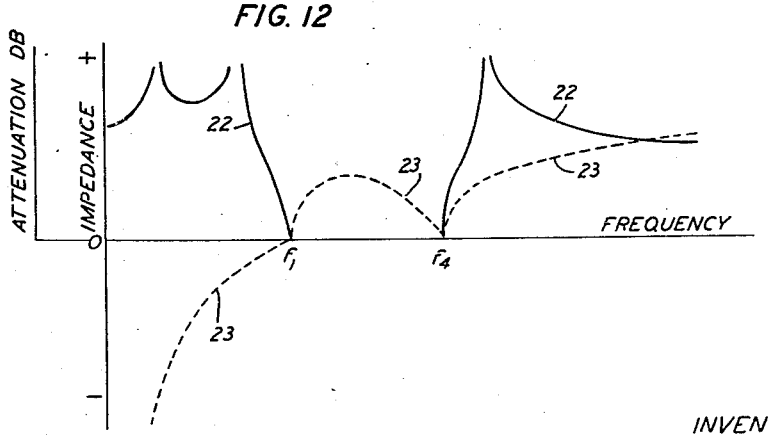
Figure 13:
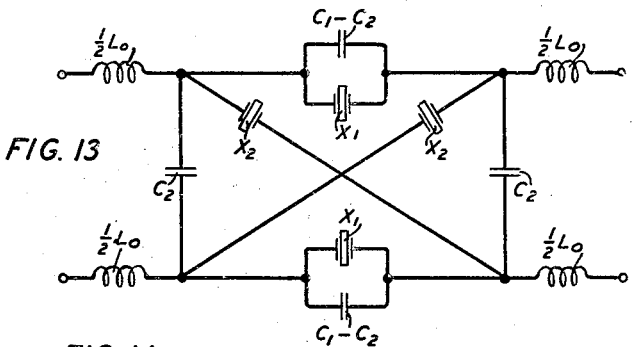
Figure 14:
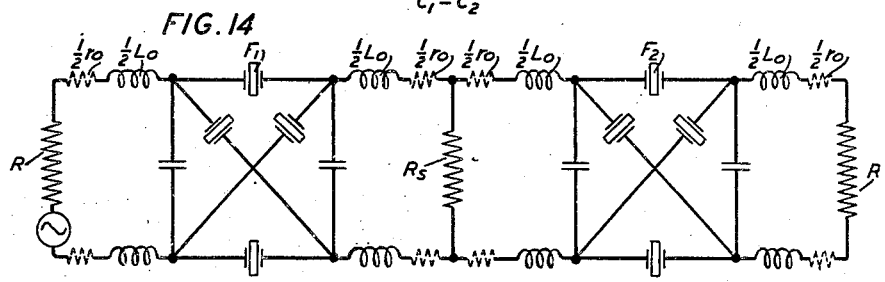
Figure 15:
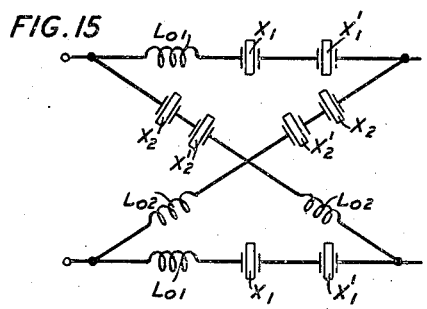
Figure 16:
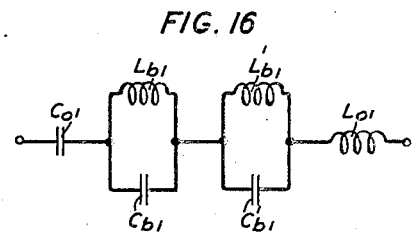
Figure 17:
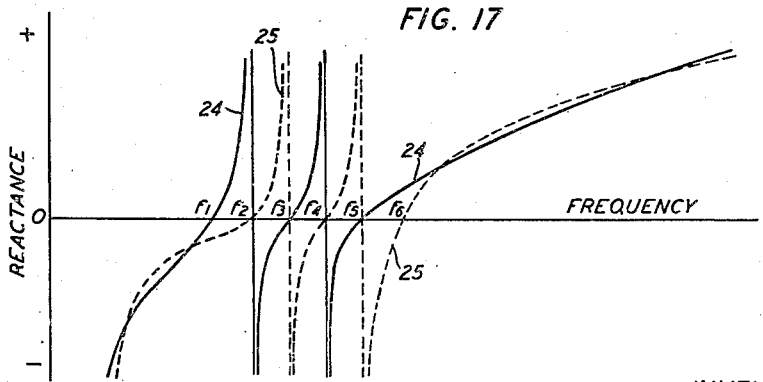
Figure 18:
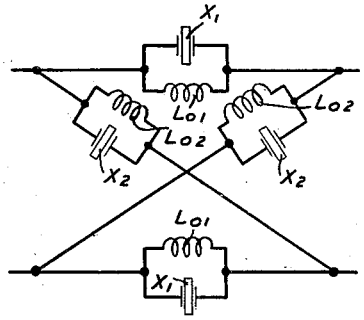
Figure 19:
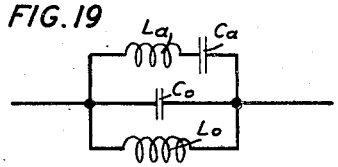
Figure 21:
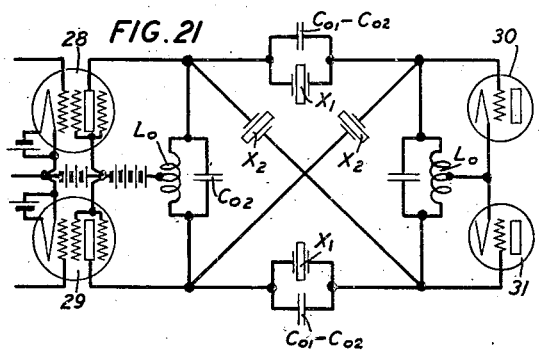
Figure 20:
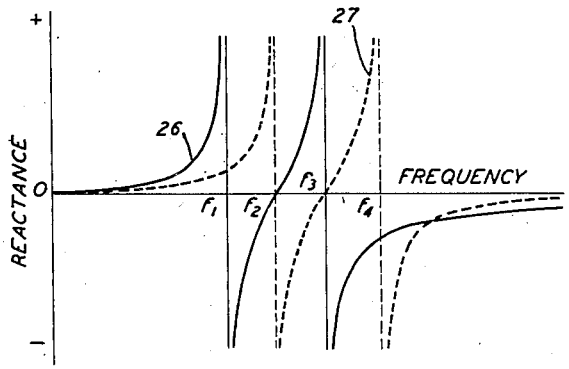
Figure 22:
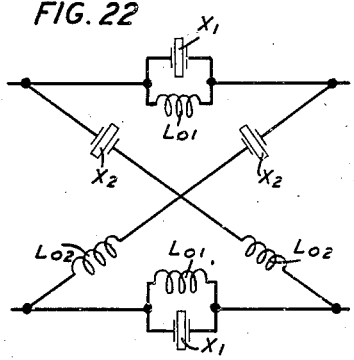
Figure 23:
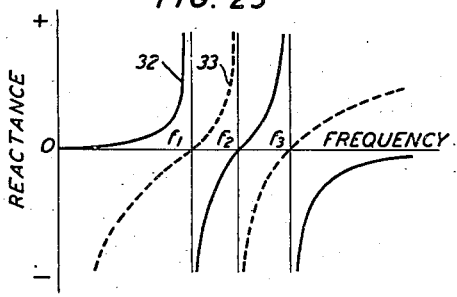
Figure 24:
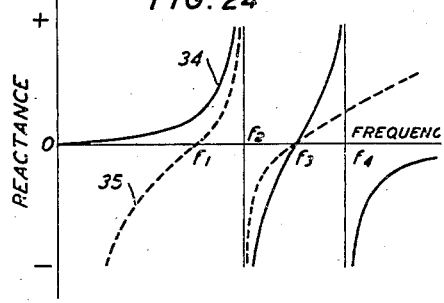

The invention will be more fully understood from the following detailed description of representative circuits in which it is embodied and of the principles of their design and operation. Of the accompanying drawings, Figs. 1 to 4 are explanatory of crystal properties, Fig. 5 shows a simple filter circuit of the invention and Fig. 6 illustrates certain characteristics of the filter of Fig. 5, Figs. 7 to 9 are explanatory of impedance combinations used in preferred forms of the invention, Fig. 10 shows one preferred form of the invention, the characteristics of which are illustrated by Figs. 11 and 12, Fig. 13 shows a modified form of the filter of Fig. 10, Fig. 14 shows a tandem connection of the filters of the invention, Figs. 15, 16 and 17 show the circuit of a multiple crystal filter of the invention and certain of its characteristics, Figs. 18, 19 and 20 show another type of filter of the invention, and its impedance characteristics, Fig. 21 shows a modified form of the filter of Fig. 18 used as an amplifier coupling network, Fig. 22 shows a network embodying features of the networks of Figs. 10 and 18 and, Figs. 23 and 24 illustrate different possible characteristics of the network of Fig. 22.

A form of crystal suitable for use in wave filters for frequencies up to about 500 kilocycles per second is shown in Fig. 1 in which 10 represents a rectangular crystal, preferably of quartz, having its length $l$ parallel to the mechanical axis MM', its width $w$ parallel to the optical axis OO' and its thickness $t$ in the direction of the electrical axis EE'. Electrodes 11 and 12 are applied to the large faces of the crystal, that is, to the surfaces perpendicular to the electrical axis, preferably by the electrical deposition of a layer of silver or other metal to secure an intimate contact over the whole surface. Leads 13 and 14 are connected to the electrodes by soldering with soft solder or by other appropriate means.

Crystals of this type when subjected to an alternating potential difference between the electrodes vibrate mainly by expansion and contraction in the direction along the mechanical axis. They should therefore be supported between points or knife edge clamps such as 15 and 16, located close to the center of the crystal along the optical axis.

Figure 2:
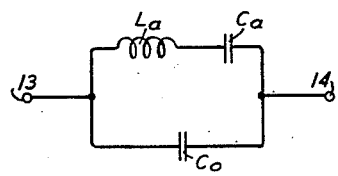

For frequencies up to and well above the first resonance the electrical impedance of a crystal of the type described above is of a simple character corresponding to that of an electrical circuit of the type shown in Fig. 2. Other resonances representing changes in the mode of vibration are practically eliminated so long as the length is greater than the width and the thickness is relatively small. The impedance, which is practically wholly reactive, has a frequency characteristic of the type shown in Fig. 4. At low frequencies the reactance is negative or capacitive, the magnitude diminishing with increasing frequency to zero at a resonance frequency $f_a$. Above this frequency the reactance becomes positive and rises rapidly to an infinite value at an anti-resonance frequency $f_b$, above which it again becomes negative.

The equivalent circuit of Fig. 2 comprises two parallel branches connected between terminals 13 and 14, one branch consisting of an inductance $L_a$ and a capacity $C_a$ connected in series and the other branch comprising a simple capacity $C_0$. The resonance frequency $f_a$ corresponds to the resonance of $L_a$ and $C_a$ and the anti-resonance frequency $f_b$ to the loop resonance of $L_a$ with $C_a$ and $C_0$ in series.

The values of the elements of the equivalent electrical circuit in terms of the crystal dimensions depend to a slight extent upon the shape of the crystal and upon the proportion of the surfaces covered by the electrodes. For quartz crystals that are relatively long and thin and have electrodes co-extensive with their surfaces the following values have been found to apply generally, $$L_a = \frac{106.1 lt}{w} \text{ Henries}$$
$$C_a = \frac{.322 w l 10^{-14}}{t} \text{ Farads} \quad (1)$$
$$C_0 = \frac{40.2 w l 10^{-14}}{t} \text{ Farads}$$

in which the dimensions $l$, $t$, and $w$, are measured in centimeters.

The capacity $C_0$ may be termed the electrostatic capacity of the crystal electrodes, that is, the capacity existing between the crystal electrodes in the absence of any reaction due to the piezo-electric effect in the quartz. It may be determined, for example, by measuring the capacity between the electrodes when the crystal is so clamped as to prevent it from moving under the action of the piezo-electric force. The inductance $L_a$ and the capacity $C_a$ involve the piezo-electric properties of the crystal. It is to be noted that $C_0$ is very large compared with $C_a$, the ratio of the values being substantially equal to 125. The effect of this great disparity is to bring the two resonance frequencies $f_a$ and $f_b$ very close together and to make the crystal impedance substantially that of the electrode capacity at all frequencies outside of a narrow range in the neighborhood of the resonances.

The resonance frequencies $f_a$ and $f_b$ are found to have the following values:

$$f_a = \frac{10^6}{9.35 l}, \text{ c. p. s.}$$
$$\text{and} \quad\quad\quad\quad\quad\quad\quad\quad (2)$$
$$f_b = 1.004 f_a$$

These frequencies depend only on the length of the crystal and are independent of the width and thickness. Varying the width and the thickness while maintaining the length constant permits the inductance and capacity values, or the L/C ratio, to be varied through a wide range of values.

Figure 3:
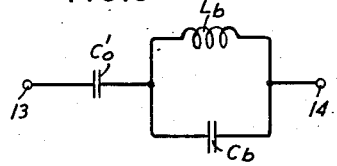
Figure 4:
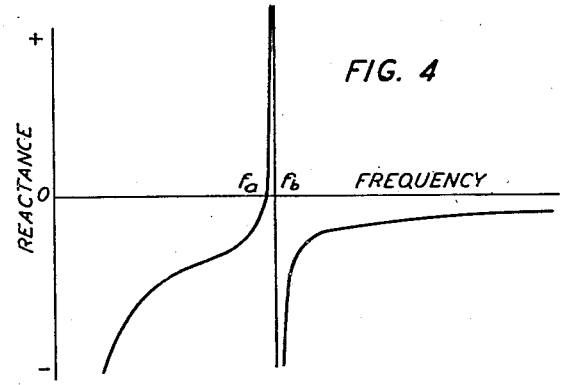

A second equivalent electrical circuit is shown in Fig. 3 comprising a capacity $C_0'$ in series with an inductance $L_b$ and a capacity $C_b$ connected in parallel. The values of which are as follows:

$$C_0' = \frac{40.52 w l 10^{-14}}{t} \text{ farads}$$
$$C_b = \frac{5075 w l 10^{-14}}{t} \text{ farads} \quad (3)$$
$$L_b = \frac{66.8 l t 10^{-14}}{w} \text{ henries}$$

The equivalent impedance shown in Fig. 2 may be regarded as comprising a very "stiff", or high impedance, resonant circuit characterized by a large value of the ratio $L_a/C_a$, in parallel with a low impedance capacity. In Fig. 3 the combination corresponds to a low impedance anti-resonant circuit in series with a high impedance capacity. The resonant branch in Fig. 2 has an L/C ratio about 250 million times that of the anti-resonant circuit in Fig. 3. The series capacity $C_0'$ in Fig. 3 is equal to the sum of $C_0$ and $C_a$ in Fig. 2 or to the total capacity of the crystal. The ratio of $C_b$ to $C_0'$ has the same value as the ratio of $C_0$ to $C_a$.

A band-pass filter in accordance with the invention using only piezo-electric crystal impedance elements is shown in Fig. 5. These are arranged in the form of a symmetrical lattice between a pair of input terminals AA' and a pair of output terminals BB', two similar crystals $X_1$ constituting the line branches and two other similar crystals $X_2$ constituting the lattice branches. The impedance characteristics of the two branches and the conditions necessary for securing a single continuous pass-band are illustrated by the curves of Fig. 6 of which the continuous line curve corresponds to the impedance $Z_1$ of the line crystals and the dotted line curve to the impedance $Z_2$ of the lattice crystals.

It is well known that in a symmetrical lattice type filter a pass-band will occur in those ranges where the line and the lattice reactances are of opposite sign. It follows therefore that a single pass-band will be obtained in the filter of Fig. 5 if the common resonance frequency of the one pair of crystals is made to coincide with the anti-resonance frequency of the other pair. This condition is illustrated in Fig. 6, the pass-band extending from the lower resonance frequency $f_1$ to the upper anti-resonance frequency $f_2$. From Equation 2 it follows that the separation of $f_1$ and $f_2$, i. e. the band width, cannot exceed 0.8 per cent. of the frequency $f_1$. Filters of this type are suited only for narrow band transmission, but at frequencies above about 250 kilocycles, the band will be wide enough to transmit a speech modulated wave. The lattice arrangement, however, permits the maximum possible band to be obtained.

The attenuation outside the band depends on the value of the ratio $Z_1/Z_2$ and is infinite when this ratio is equal to unity. Since the crystal impedances at frequencies away from resonance are substantially equal to the impedances of the electrode capacities it follows that, for high attenuation, the line and the lattice crystals should have substantially equal capacities. If the capacities are exactly equal the attenuation at zero frequency and at very high frequencies will be infinite, but by making the capacity of the higher frequency crystals slightly smaller than that of the others the frequencies of infinite attenuation can be moved close to the band limits.

Figure 7:
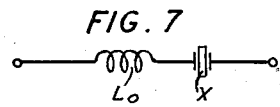

The restriction of the band width present in the filter of Fig. 5 may be largely removed by combining inductance elements with the piezo-electric crystals. Fig. 7 shows one type of combination which may be used for the branch impedances of the filters of the invention and Fig. 8 shows the electrical equivalent of Fig. 7. The effect of the added inductance upon the impedance is illustrated by the curves of Fig. 9 of which curve 17 represents the frequency variation of the reactance of the crystal alone, straight line 18 represents the added inductive reactance, and curve 19 the total impedance of the combination. The crystal resonance is shifted downwards in the frequency scale from $f_a$ to $f'_a$ and a new resonance frequency $f_c$ is introduced above the anti-resonance frequency $f_b$. The values of $f'_a$ and $f_c$ for any given inductance may be calculated by ordinary methods.

Certain relationships between the critical frequencies of the combination and those of the crystal alone are of particular interest. If $f_0$ denote the resonance frequency of the combination $L_0 C_0'$ it may be shown that $$\left.\begin{array}{l} f_a' f_c = f_0 f_b \\ \text{and} \\ (f_c - f_a')^2 = (f_b - f_0)^2 + f_0^2 \dfrac{C_0'}{C_b} \end{array}\right\} \quad (4)$$

It is clear that the separation of the frequencies $f_c$ and $f'_a$ is a minimum when $f_b$ is equal to $f_0$, that is, when the added inductance is of such value as to resonate with the total crystal capacity at the anti-resonance frequency of the crystal. Under this condition the critical frequencies of the combination form a geometric series, $f_b$ being the geometric mean. The minimum separation of $f_c$ and $f_a'$ is equal to $$f_b \sqrt{\dfrac{C_0'}{C_b}}$$

or, for a quartz crystal, $0.0895 f_b$.

The resonance condition set forth above means that the total crystal capacity, which is the sum of the component $C_0$, defined as the electrostatic capacity of the crystal electrodes, and the component $C_a$ due to the piezo-electric effect, is neutralized by the added inductance at the anti-resonance frequency of the crystal. The total capacity thus neutralized is very closely equal to the crystal electrode capacity and the reactance of the added inductance is therefore substantially equal to the reactance of the crystal electrode capacity at the frequency indicated. This substantial equality and the neutralization resulting therefrom obtains throughout a fairly wide range of frequencies on both sides of the crystal resonance frequency. In the neighborhood of the resonances, therefore, the impedance of the combination is substantially that of the anti-resonant circuit $L_b C_b$.

If the added inductance is smaller than required for neutralization the separation of the critical frequencies will be increased mainly by shifting the upper resonance $f_c$ upwards in the frequency scale without much shift in the location of the lower resonance. If the inductance is greater than required for neutralization the lower resonance frequency is shifted downwards without much shift of the upper resonance. Evidently the amounts by which these frequencies may be shifted are not limited.

Since the minimum separation depends only on the capacity ratio $C_0'/C_b$ it follows that its value can be made as small as desired by the addition of a capacity in shunt to the crystal or in series therewith. Such capacity should be of a type having a very low energy dissipation, preferably a well insulated air condenser.

Fig. 10 shows a lattice type band-pass wave filter the branches of which consist of crystal and inductance combinations of the type shown in Fig. 7. The line branches comprise crystals $X_1$ and series inductances $L_{01}$ and the lattice branches crystals $X_2$ and inductances $L_{02}$. Small variable condensers $C_1$ and $C_2$ are shown shunting the line and the lattice crystals, respectively, the purpose of these being to augment the electrode capacity and provide additional control of the band width.

The reactance characteristics of the branch impedances of the filter of Fig. 10 and the conditions for the provision of a single pass-band are illustrated by the curves of Fig. 11, of which curve 20 represents the reactance variation of the line branch impedances $Z_1$ and curve 21 the reactance of the lattice branch impedances $Z_2$. The line branches have critical frequencies $f_1$, $f_2$, and $f_3$ in ascending order and the lattice branches have critical frequencies $f_2$, $f_3$, and $f_4$. The coincidence of the critical frequencies at $f_2$ and $f_3$ provides a continuous band extending from $f_1$ to $f_4$.

The spacing of the critical frequencies in Fig. 11 corresponds to a filter in which the line branch inductances are too small to neutralize the crystal capacity at the crystal frequency and the lattice branch inductances are greater than required for this purpose. The crystal capacities are assumed to include the auxiliary shunt capacities $C_1$ and $C_2$ which may be considered simply as part of the electrode capacities. It is evident that by diminishing the line branch inductances and correspondingly increasing the lattice branch inductances, or vice versa, pass-bands of any desired width can be obtained. However, very wide bands can be obtained in this way only with a sacrifice of the attenuation at frequencies above the band. High attenuation requires the line and the lattice impedances to be substantially equal at frequencies outside the band and, since at high frequencies the impedances are substantially those of the added inductances, any large disparity of the inductances will result in low attenuation. Very wide bands can also be obtained by making the crystals of greatly different capacities, for example by making the line crystals narrow and thick and the lattice crystals wide and thin. This will permit the inductances to be made more or less equal so that the attenuation at high frequencies will be great, but the attenuation at low frequencies will be greatly diminished.

It follows therefore that for high attenuation at all frequencies remote from the band the line and the lattice crystals should have about equal capacities and the added inductances should also be about equal and of such values as to neutralize the respective capacities at frequencies close to the crystal resonances. This results in a limitation of the possible band width since, under the condition of approximate capacity neutralization, the upper and lower resonance frequencies of the two branches will have about the minimum separation determined by the capacity ratio.

When no shunt capacities are used the maximum band width compatible with high attenuation is about 14 or 15 per cent. of the mean band frequency. The addition of capacities in shunt to the crystals, by reducing the minimum separation of the branch impedance resonances makes it possible to obtain bands of any width from the above mentioned limit down to less than one per cent. Capacities added in series with the crystals provide the same type of control of the band width but require larger series inductances to be used to effect neutralization at the same frequencies.

Formulae for the design of a filter of the type shown in Fig. 10 are given below. In accordance with a theorem described in an article by R. M. Foster on "A Reactance Theorem", Bell System Technical Journal vol. III, No. 2, April, 1924, page 259, the values of the branch impedances may be expressed in terms of the critical frequencies as follows:

$$Z_1 = \frac{L_{01}}{j\omega} \frac{(\omega_1^2 - \omega^2)(\omega_3^2 - \omega^2)}{(\omega_2^2 - \omega^2)}$$
and
$$Z_2 = \frac{L_{02}}{j\omega} \frac{(\omega_2^2 - \omega^2)(\omega_4^2 - \omega^2)}{(\omega_3^2 - \omega^2)} \quad (5)$$

where $\omega$ is $2\pi$ times frequency.

Considering each branch as equivalent to a chain of anti-resonant circuits as shown in Fig. 8, the inductance $L_0$ being anti-resonant at infinite frequency and the capacity $C_0'$ at zero frequency, the same theorem gives the capacity and inductance values directly. For the line branches these are $$\frac{1}{C_{01}'} = L_{01} \frac{\omega_1^2 \omega_3^2}{\omega_2^2}$$
$$\frac{1}{C_{b1}} = \frac{L_{01}}{\omega_2^2}(\omega_2^2 - \omega_1^2)(\omega_3^2 - \omega_2^2) \quad (6)$$
$$L_{b1} = \frac{L_{01}}{\omega_2^4}(\omega_2^2 - \omega_1^2)(\omega_3^2 - \omega_2^2)$$

and for the lattice branches $$\frac{1}{C_{0'2}} = L_{02} \frac{\omega_2^2 \omega_4^2}{\omega_3^2}$$
$$\frac{1}{C_{b2}} = \frac{L_{02}}{\omega_3^2}(\omega_3^2 - \omega_2^2)(\omega_4^2 - \omega_3^2) \quad (7)$$
$$L_{b2} = \frac{L_{02}}{\omega_3^4}(\omega_3^2 - \omega_2^2)(\omega_4^2 - \omega_3^2)$$

These formulae require that the values of the series inductances and of the critical frequencies be assigned. The latter must be so chosen that the ratios $C_{b1}/C_{01}'$ and $C_{b2}/C_{02}'$ are both greater than 125, otherwise the impedances cannot be realized with physical crystal structures.

The choice of the values of the series inductances and of the critical frequencies may be determined by consideration of the characteristic impedance and the propagation constant of the filter. The characteristic impedance $K$ is given by $$K = \sqrt{Z_1 Z_2}$$
$$= \frac{\sqrt{L_{01} L_{02}}}{\omega} \sqrt{(\omega^2 - \omega_1^2)(\omega_4^2 - \omega^2)} \quad (8)$$

the value being zero at the two band limits and having a maximum value at the geometric mean of the band limiting frequencies. This maximum is given by $$K_m = \sqrt{L_{01} L_{02}}(\omega_4 - \omega_1) \quad (9)$$

When the value of $K_m$ is prescribed, for example in relation to the impedances between which the filter is to work, the product $L_1 L_2$ is fixed. If the inductances are made equal, Equation 9 determines their common magnitude.

The propagation constant $P$ is a function of the ratio $Z_1/Z_2$ given by $$\tanh \frac{P}{2} = \sqrt{\frac{Z_1}{Z_2}} \quad (10)$$

and is infinite when $Z_1$ is equal to $Z_2$. Equating the values of the impedances given by Equations 5 a cubic equation in $\omega^2$ is obtained indicating that the impedances may be equal at three different frequencies corresponding to peaks of infinite attenuation. The roots of this equation establish relationships between the attenuation peak frequencies and the critical frequencies of the impedances whereby the latter may be evaluated for assigned values of the former.

Typical attenuation and characteristic impedance curves are illustrated in Fig. 12, the solid line curve 22 showing the variation of the attenuation with frequency and the dotted line curve 23 representing the characteristic impedance. The particular case illustrated corresponds to the case where the higher frequency crystal has a greater series inductance and a lower capacity than the lower frequency crystal. By changing slightly the relative values of the crystal capacities and the series inductances, various distributions of the peak frequencies can be obtained, two of the peaks, in general, being located on one side of the band and one on the other. Moreover when the inductances and the capacities of the two different branches are respectively about equal the peaks will be superimposed upon a general high level of attenuation and may be located close to the band limits to sharpen the cut-off of the filter.

In a modified form of the invention the added inductances of the line and the lattice branches are made equal and are connected externally to the lattice as shown in Fig. 13. It may readily be shown by a comparison of the open circuit and short circuit impedances in the two cases that, if equal impedances are added in series with each of the arms of a symmetrical lattice the resulting lattice is equivalent in all its transmission characteristics to the original lattice in combination with a line impedance at each end equal to the added impedance. Likewise the addition of equal impedances in shunt to each branch is equivalent to adding the same impedance in shunt at each end of the lattice.

If in the network of Fig. 10 the added inductances $L_{01}$ and $L_{02}$ have the common value $L_0$ and if the shunting capacity $C_2$ is smaller than $C_1$ a double application of the above principle results in the circuit of Fig. 13 in which the lattice includes only crystals and a minimum amount of shunt capacity. It is evident that any resistance present in the inductances $L_0$ may be treated as though it were part of the terminal impedances between which the filter operates and may be compensated for, if necessary, by designing the filter with a slightly higher characteristic impedance. Its effect upon the selectivity of the filter will then be negligible. This result is not peculiar to the circuit of Fig. 13, but may be had with other lattice structures, such as that of Fig. 10, in which the resistances of the several arms can be equalized so that they become equivalent to resistances added in series or in shunt external to the lattice.

When a single filter of the type of Fig. 13 is connected between a pair of resistive terminal impedances it provides a coupling network which is substantially purely reactive. However when two such networks are connected in tandem the resistances of the adjoining end inductances appear in the middle of the network and may produce some disturbing effects of the character of distortion in the band and a diminution of the sharpness of selectivity. Fig. 14 shows how these effects can be to a large extent eliminated. Two filters $F_1$ and $F_2$ each having external inductances $L_0$ are connected in tandem between equal terminal impedances of resistance R. The series inductances will be equal since the filters necessarily have the same band limits and the same characteristic impedance. The resistances of the added inductances are shown dotted and designated $r_0$. At the junction point of the two filters a shunt resistance $R_s$ is inserted, its value being such that the series-shunt network formed by this resistance and the adjacent coil resistance has a characteristic impedance equal to the terminal resistances. Each filter is thus terminated symmetrically at both ends and the selectivity is unimpaired. The value of the resistance $R_s$ should be approximately $R^2/2r_0$.

Fig. 15 shows a filter in accordance with the invention in which each arm contains a plurality of crystals connected in series and also a series inductance. It will be understood that each crystal may also be shunted by a condenser to augment the electrode capacity as already described in connection with Fig. 10. Using the equivalent circuit of Fig. 3 for each of the crystals the electrical equivalent of the line branches is as shown in Fig. 16 in which $C_{01}$ is the resultant of the combination of the two series capacities, anti-resonant circuit $L_{b1} C_{b1}$ corresponds to crystal $X_1$, anti-resonant circuit $L_{b1}' C_{b1}'$ to crystal $X_1'$ and $L_{01}$ is the added inductance.

The curves of Fig. 17 show the reactance variations of the two branches and illustrate the requirement for the formation of a single continuous band. Curve 24 corresponds to $Z_1$ the line branch impedance the critical frequencies being designated $f_1, f_2, f_3, f_4$ and $f_5$ in ascending order. Curve 25 corresponds to the lattice branch impedance $Z_2$, the condition of band continuity requiring the first four of the critical frequencies to coincide with $f_2, f_3, f_4$ and $f_5$ respectively the remaining frequency being designated $f_6$. The band limits are frequencies $f_1$ and $f_6$.

If the critical frequencies and the series inductances are assigned the remaining coefficients may be computed by means of Foster's reactance theorem as already described. The values of the series inductances may be assigned by specifying the characteristic impedance at the mean band frequency, the expressions for the characteristic impedance in terms of the band limits being similar to Equations 8 and 9. The critical frequencies may be assigned arbitrarily, but preferably should be located with reference to a desired transmission characteristic, for example in accordance with the principles disclosed in U. S. Patent 1,828,454 issued October 30, 1931 to H. W. Bode relating to the optimum distributions of the critical frequencies for linear phase shift in the transmission band and high attenuation outside the band.

As in the case of the filter of Fig. 10 the fact that the capacity ratio of quartz crystals has a fixed value of about 125 makes the maintenance of high attenuation outside the transmission band possible only with relatively narrow band widths. In this respect it has been found that the use of additional crystals does not make wider bands possible, the maximum band width compatible with high attenuation being substantially the same as for the single crystal filter of Fig. 10.

An arrangement of the critical frequencies which has been found to give satisfactorily high attenuation and sharp selectivity is in accordance with a geometric series. This arrangement also leads to simplified design formulae and gives physically realizable circuits for all band widths up to about 14 per cent. To achieve this frequency allocation the added inductance in each branch should be proportioned to resonate with the effective series capacity at the geometric mean of the crystal anti-resonance frequencies and the crystals should be proportioned to have the same "stiffness" or inductance to capacity ratio. The neutralization of the effective crystal capacity thus occurs close to the middle of the transmission band and is more or less complete throughout the band.

Other arrangements using larger numbers of crystals may be used in accordance with the invention and the crystals may be connected either in series or in parallel the design procedure being similar in any case to that described above.

Another type of filter circuit in accordance with the invention is shown in Fig. 18 in which each branch of the lattice comprises a crystal shunted by an inductance. The circuit is symmetrical, the two line branches including similar crystals $X_1$ and equal inductances $L_{01}$ and the lattice branches crystals $X_2$ and inductances $L_{02}$. The electrical equivalent of each of the branches is a circuit of the type shown in Fig. 19 in which the inductance-capacity combination $L_a, C_a, C_0$ takes the place of the crystal. The values of these quantities for a quartz crystal are given in terms of the crystal dimensions by Equation 1. The impedances of the complete branch networks and the element values may be expressed in terms of the critical frequencies by means of the reactance theorem to which reference has already been made, each branch being treated as a parallel connected system of resonant circuits. The reactance variation is characterized by two anti-resonance frequencies and an intermediate resonance frequency as shown by curves 26 and 27 of Fig. 20 which correspond respectively to the line impedances $Z_1$ and the lattice impedances $Z_2$ of Fig. 18. The resonance frequency $f_2$ of impedance $Z_1$ is the resonance of the crystal itself, that is of the combination $L_a C_a$. The locations of the anti-resonance frequencies $f_1$ and $f_3$ vary in the same general way with variation of the added inductance as the resonance frequencies in the series case illustrated by Figs. 8 and 9. A minimum separation equal to $$f_2 \sqrt{\frac{C_a}{C_0}}$$

is obtained when the added inductance neutralizes the capacity $C_0$ at the crystal resonance frequency, the three critical frequencies being then related in a geometric progression. The addition of a capacity in shunt to the crystal serves to reduce the minimum separation and so provides an adjustment for the band width as already described.

When the two impedances are adjusted for proper coincidence of the critical frequencies the circuit provides a single continuous transmission band extending from $f_1$, the lower anti-resonance of $Z_1$, to $f_4$, the upper anti-resonance of $Z_2$.

The same type of limitations to the band width and the attenuation apply to this type of filter as to the filters of Figs. 10 and 15 and the same rules as to the values of the added inductances and the crystal capacities should be followed to attain high attenuation.

A feature of the shunt compensated type of Fig. 18 is the high value of its characteristic impedance in the transmission band. The general expression for the characteristic impedance, K, is $$K^2 = \frac{\omega^2}{C_{01}C_{02}(\omega^2-\omega_1^2)(\omega_4^2-\omega^2)} \quad (11)$$

The value $K_m$ at the mean band frequency being given by $$K_m = \frac{1}{(\omega_4-\omega_1)\sqrt{C_{01}C_{02}}} \quad (12)$$

where $C_{01}$ and $C_{02}$ are the electrode capacities of crystals $X_1$ and $X_2$ respectively. Since the capacities $C_{01}$ and $C_{02}$, including external shunting capacities, may be as small as from 5 to 50 m. m. f. in filters designed for frequencies of 50,000 c. p. s. upwards, the mean frequency impedance for band widths of from 5,000 to 10,000 c. p. s. will range from about 200,000 ohms to greater than one million ohms.

A modified form of the filter of Fig. 18 corresponding to the condition that the shunting inductances of the line and the lattice branches are equal is shown in Fig. 21, the common inductances $L_0$ being taken outside the lattice and connected in shunt at the input and the output terminals. If additional shunt capacities are used the smaller of these may also be connected externally in shunt as indicated by the drawings. The filter is shown with its input terminals connected to the output of a pair of screen grid amplifier tubes 28 and 29 connected in push-pull and its output terminals connected to the input terminals of a second pair of vacuum tubes 30 and 31 also connected in push-pull. Screen grid tubes ordinarily have such high internal resistance that connected circuits using electrical inductances and capacities cannot be effectively matched thereto, the result being that a large part of the possible amplification is lost. With filters of the type described above proper impedance matching becomes possible and the maximum amplification of the tube is realized. The shunt coils at the ends of the filter furnish conductive paths for the supply of plate current and grid potential to the vacuum tubes.

Fig. 22 shows a lattice network the branches of which comprise both series compensated and shunt compensated crystals. In the line branches similar crystals $X_1$ are shunted by equal inductances $L_{01}$ and in the lattice branches similar crystals $X_2$ have equal inductances $L_{02}$ connected in series. This type of network may be either of the all-pass type or may provide band suppression depending upon the correlation of the critical frequencies of the branch impedances. The case of an all-pass structure is illustrated by the reactance characteristics of Fig. 23 in which curve 32 corresponds to the line impedances and curve 33 to the lattice impedances. When the resonance of the line impedances coincides with antiresonance of the lattice impedances and vice versa the reactances are everywhere of opposite size and no attenuation band exists.

The case of a band suppression filter is illustrated by Fig. 24 in which curves 34 and 35 represent the line and lattice impedances respectively. Here the line impedances are anti-resonant at frequencies $f_2$ and $f_4$ and are resonant at an intermediate frequency $f_3$. By placing the lower resonance frequency $f_1$ of the lattice impedance below $f_2$ and making their anti-resonance and upper resonance frequencies coincide with $f_2$ and $f_3$ respectively as attenuation band extending from $f_1$ to $f_4$ is provided with pass bands below and above.

What is claimed is:

1. A broad-band wave filter comprising a plurality of impedance branches arranged between a pair of input terminals and a pair of output terminals to form a lattice network, each of said branches including a piezo-electric crystal impedance in combination with an inductance, and the reactances of the branches having different frequency characteristics proportioned with respect to each other to provide a single transmission band.

2. A broad-band wave filter comprising two pairs of similar impedance branches connected between a pair of input terminals and a pair of output terminals to form a symmetrical lattice network, each of said branches including a piezo-electric crystal impedance and an inductance, said pairs of branches having different reactance-frequency characteristics and being so proportioned with respect to each other that their reactances are of opposite sign at all frequencies of a single continuous range and of the same sign elsewhere, whereby a continuous transmission band is provided.

3. A broad-band wave filter in accordance with claim 2 in which the inductances have such values that their reactances substantially neutralize the capacity reactances of the crystal electrodes in the respective branches at frequencies close to the resonance frequencies of the crystals.

4. A broad-band wave filter in accordance with claim 2 in which the piezo-electric crystals are shunted by condensers and in which the inductances have such values that their reactances substantially neutralize the capacity reactances of the crystal electrodes and the associated shunt condensers at frequencies close to the resonance frequencies of the crystals.

5. A broad-band wave filter in accordance with claim 2 in which the resistances of the inductances included in the several branches are equalized whereby the effect of energy dissipation therein upon the sharpness of selectivity of the filter is made negligibly small.

6. A broad-band wave filter in accordance with claim 2 in which the inductances are connected in series with the crystals in the respective branches.

7. A broad-band wave filter in accordance with claim 2 in which the inductances are connected in shunt to the crystals in the respective branches.

8. A broad-band wave filter comprising a plurality of impedance branches connected between a pair of input terminals and a pair of output terminals, each of said branches including a piezo-electric crystal impedance and an inductance for substantially neutralizing the electrode capacity of the crystal at frequencies close to its resonance frequencies.

9. In a broad band wave filter comprising a plurality of impedance branches, an impedance branch comprising a piezo-electric crystal and an inductance as impedance elements, said inductance having a reactance substantially equal to the reactance of the crystal electrode capacity at frequencies close to the crystal resonance frequency whereby the impedance of the said branch has a plurality of critical frequencies located at frequencies forming a substantially geometric series.

10. A broad-band wave filter comprising two pairs of similar impedance branches disposed between a pair of input terminals and a pair of output terminals to form a symmetrical lattice network, each of said branches including a piezoelectric crystal impedance, an auxiliary condenser and an inductance, said inductances being proportioned to substantially neutralize the effective capacity reactances of the respective crystals at their resonance frequencies whereby a transmission band of minimum width is obtained, and said auxiliary condensers being proportioned to modify the effective capacities of the crystals in accordance with a desired value of said minimum band width.

11. A broad-band wave filter comprising two pairs of similar impedance branches disposed between input terminals and output terminals to form a symmetrical lattice network, each of said branches including a piezo-electric crystal impedance in combination with an inductance, said pairs of branches having different reactance-frequency characteristics proportioned with respect to each other to provide a single transmission band, the inductances in all of said branches being substantially equal and the effective capacities of all of said crystals being likewise substantially equal whereby the attenuation outside said transmission band is maintained at a high level at all frequencies.

12. A broad-band wave filter comprising a plurality of impedance branches arranged to form a lattice network, each of said branches including a piezo-electric crystal impedance and an inductance in series therewith.

13. A broad-band wave filter comprising a plurality of impedance branches arranged to form a lattice network, each of said branches including a piezo-electric crystal impedance, a capacity in shunt thereto and an inductance in series therewith.

14. A broad-band wave filter comprising a plurality of piezo-electric crystals connected between two pairs of terminals to form a lattice network and inductance elements connected to said terminals external to said lattice, said inductances cooperating with the impedances of said crystals to provide a continuous transmission band.

15. A broad band wave filter comprising two pairs of piezo-electric crystals connected to form a symmetrical lattice network, said pairs of crystals having substantially equal electrode capacities and having different resonance frequencies, and inductance elements included in branches external to said lattice, said inductances cooperating with the impedances of said crystals to provide a continuous transmission band.

16. A broad band wave filter comprising two pairs of similar impedance branches arranged to form a symmetrical lattice between a pair of input terminals and a pair of output terminals, each of said branches including a piezo-electric crystal impedance, the crystals in one of said pairs of branches being resonant at a common frequency and anti-resonant at a higher common frequency, and the crystals in the other pair of branches being proportioned to be anti-resonant at the resonance frequency of the impedances of the first pair of branches, whereby a continuous transmission band is provided of width at least as great as the sum of the intervals between the resonance and anti-resonance frequencies of the crystals in the two pairs of branches.

WARREN P. MASON.